United States Patent [19]

McFarlane et al.

[11] Patent Number: 4,840,128

[45] Date of Patent: Jun. 20, 1989

[54] EATING TABLE WITH INSET BARBECUE

[75] Inventors: Robert McFarlane; Stewart M. Walker, both of Glasgow, Scotland

[73] Assignee: Trading Post Restaurants Limited, Glasgow, Scotland

[21] Appl. No.: 162,421

[22] Filed: Mar. 1, 1988

[51] Int. Cl.[4] ............................................. F24C 3/00
[52] U.S. Cl. ................................... 108/50; 126/41 R; 126/211; 126/299 R
[58] Field of Search .......... 108/50; 126/41 R, 299 R, 126/299 D, 39 R, 42, 211, 214 R, 214 A

[56] References Cited

U.S. PATENT DOCUMENTS

| | | | |
|---|---|---|---|
| 1,370,113 | 3/1921 | Janusonis | 126/211 |
| 2,790,434 | 4/1957 | Del Francia | 126/41 |
| 4,157,705 | 6/1979 | Caan | 126/211 |
| 4,335,705 | 6/1982 | Kiyomitu | 126/299 R |
| 4,582,046 | 4/1986 | Yamada | 126/299 R |
| 4,616,626 | 10/1986 | Soon | 126/41 R X |
| 4,635,613 | 1/1987 | Tucker et al. | 126/41 R |
| 4,635,614 | 1/1987 | Segroves | 126/41 R |

Primary Examiner—Peter A. Aschenbrenner
Attorney, Agent, or Firm—Arnold, White & Durkee

[57] ABSTRACT

A table (10) comprises a table top (11) having a centralized aperture into which a charcoal grill barbeque (12) is inset. Eating stations (13) are provided around the barbeque (12) on the table top (11) and a frame arrangement (21) fitted to barbeque (12) projects above the level of the table top (11) to prevent splashing thereof during use of the barbeque (12).

3 Claims, 2 Drawing Sheets

U.S. Patent   Jun. 20, 1989   Sheet 1 of 2   4,840,128

EATING TABLE WITH INSET BARBECUE

This invention relates to tables.

According to the present invention there is provided a table having a table top with an aperture and a charcoal grill barbeque set into said aperture.

Preferably the grill barbeque incorporates a griddle overlying a bed of charcoals, the griddle being substantially horizontal.

Preferably a stainless steel frame arrangement is releasably fitted at the peripheral interface between the grill barbeque and the table top, said frame arrangement including an upstanding portion peripherally surrounding the barbeque.

The present invention will now be described by way of example with reference to the accompanying drawings.

Figure 1:
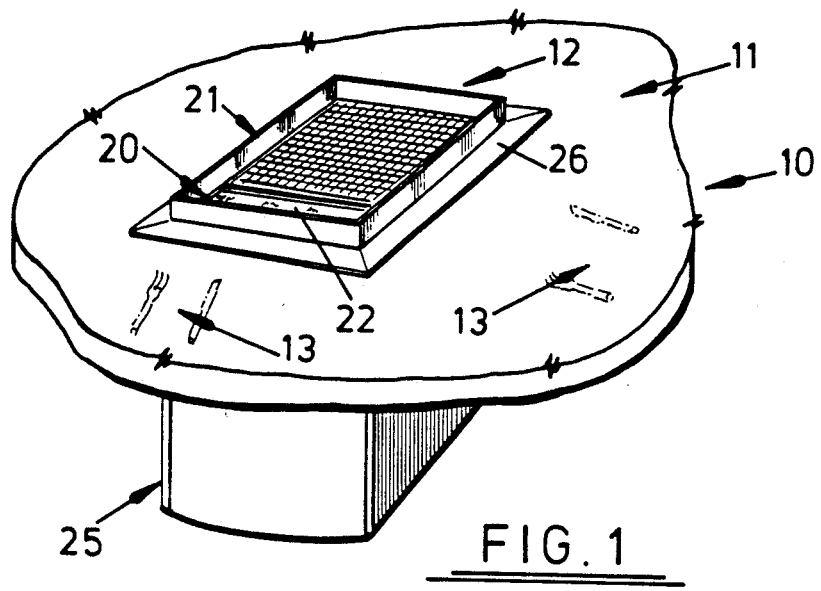

As is illustrated in FIG. 1 a table 10 comprises a table top 11 having a centralised rectilinear aperture wherein there is inset a charcoal grill barbeque 12. Barbeque 12 is positioned with respect to top 11 such that various eating stations 13 are provided around the barbeque 12 on the top 11.

Figure 2:
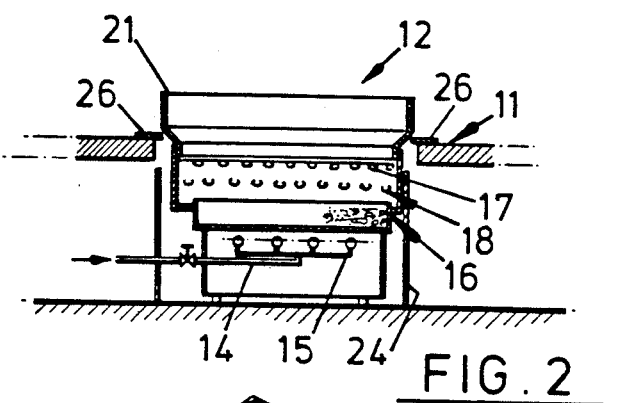

As is more clearly shown in FIG. 2 barbeque 12 comprises a gas supply pipe 14 which delivers gas to a plurality of burners 15 which in turn heat a charcoal bed 16 preferably provided with lava charcoal pieces. Above bed 16 is located griddle 17 on which pieces of meat may be barbequed. the plane of griddle 17 being parallel with the plane of table top 11 and being approximately at the same level as table top 11. Between griddle 17 and bed 16 there is located a plurality of slats 18 which are dished for collecting grease emanating from beef being grilled on the barbeque, these slats 18 being inclined longitudinally at an angle to the horizontal and delivering their collected grease into a grease tray 20 (FIG. 5).

Figure 3:
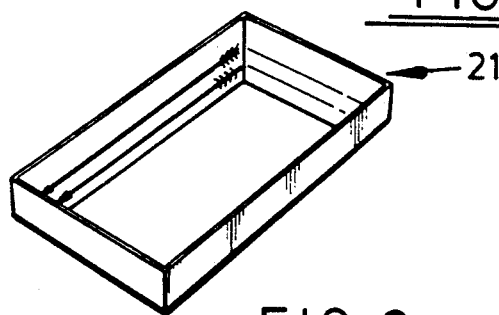

A frame arrangement 21 shown in FIG. 3 is releasably located at the interface between the barbeque 12 and the table top 11 and arrangement 21 includes a depending portion which is snugly seated on the barbeque and an upstanding portion which peripherally surrounds the barbeque 12 for the purpose of preventing splashes of grease from meat being cooked reaching the eating stations 13. At its end adjacent the grease tray 20 the frame arrangement 21 carries a plate 22 (FIG. 5) overlying the grease tray 20 to thereby provide a support surface for containers of various barbeque sauces. Plate 22 is releasable from the frame arrangement 21 and from the grease tray 20. A flat frame 26 lies on table top 11 surrounding frame arrangement 21 to neaten the appearance of the edge of the table top aperture in which the barbeque 12 is inset.

The body of the barbeque 12 which is located beneath the table top 11 is contained by a casing (not shown) which is externally surrounded by a thermal barrier 24 which conveniently is in the form of asbestos sheeting and which in turn is externally surrounded by a wooden housing 25 (FIG. 1) which forms part of the table 10 and which supports the table top 11.

Figure 4:
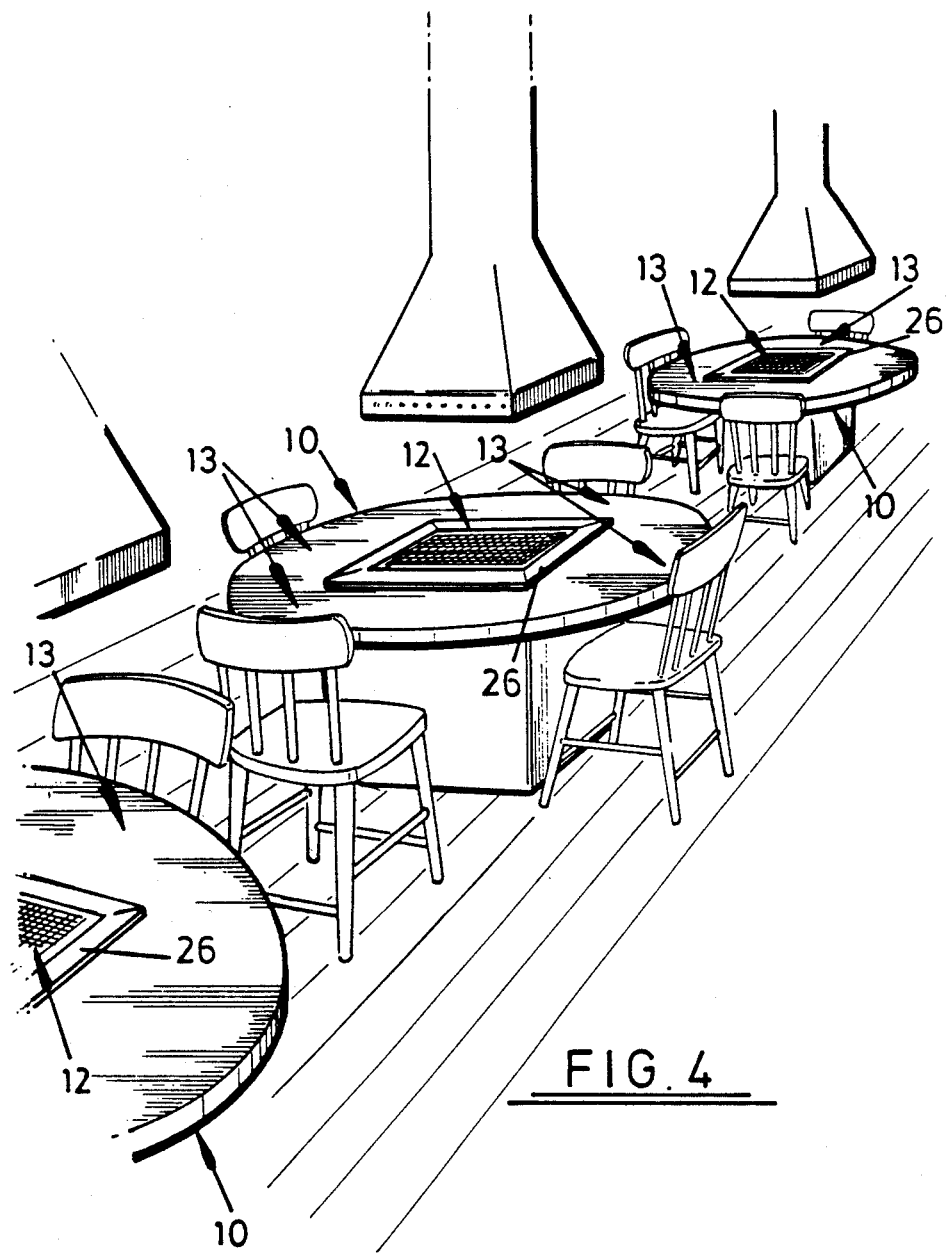

FIG. 4 illustrates the table 10 in operation, from which it will be seen that it is preferred to provide a fume extractor system vertically above the barbeque 12.

What is claimed is:

1. An eating table having a table top with a centrally disposed aperture which is surrounded by an eating zone capable of accommodating a plurality of eating stations from which seated persons may consume food,
    a charcoal gas-fired grill barbecue set into said aperture and having a body which is located beneath the table top and which is surrounded by a housing which forms part of the table and which supports the table top,
   the barbecue comprising a charcoal bed filled with charcoal lava pieces located beneath a substantially horizontal griddle which is level with the table top and on which food may be barbecued, and between the griddle and the charcoal bed there is a plurality of dished slats for collecting grease emanating from food being grilled on the barbecue, the slats being inclined at an angle to the horizontal for delivering their collected grease into a grease tray,
   the arrangement being such that persons seated around the perimeter of the table can both grill food and eat food at the table.

2. A table as claimed in claim 1, wherein a stainless steel frame arrangement is releasably fitted at the peripheral interface between the barbeque and the table top, said frame arrangement including an upstanding portion peripherally surrounding the barbeque and projecting above the level of the table top to prevent splashing thereof during use of the barbeque.

3. A table as claimed in claim 2, wherein the frame arrangement supports a cover for the grease tray within the barbeque, said cover functioning as a shelf for storing barbeque sauce containers during use of the barbeque.

* * * * *

UNITED STATES PATENT AND TRADEMARK OFFICE
CERTIFICATE OF CORRECTION

PATENT NO. : 4,840,128

DATED : June 20, 1989

INVENTOR(S) : McFarlane et al

It is certified that error appears in the above-identified patent and that said Letters Patent is hereby corrected as shown below:

Insert Fig. 5 as part of Letters Patent as shown on the attached sheet.

Signed and Sealed this

Tenth Day of April, 1990

Attest:

HARRY F. MANBECK, JR.

*Attesting Officer*    *Commissioner of Patents and Trademarks*

UNITED STATES PATENT AND TRADEMARK OFFICE
CERTIFICATE OF CORRECTION

PATENT NO. : 4,840,128

DATED : June 20, 1989

INVENTOR(S) : McFarlane et al.

It is certified that error appears in the above-identified patent and that said Letters Patent is hereby corrected as shown below:

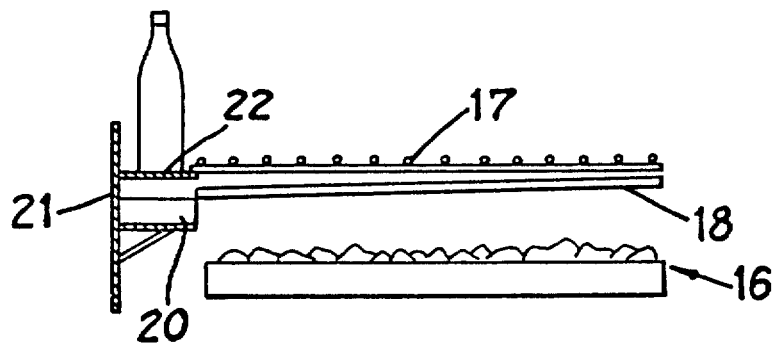

FIG. 5